(12) United States Patent
Cohen

(10) Patent No.: US 12,533,149 B2
(45) Date of Patent: Jan. 27, 2026

(54) TISSUE ENGAGING SURGICAL TOOL

(71) Applicant: Jason Cohen, Poughkeepsie, NY (US)

(72) Inventor: Jason Cohen, Poughkeepsie, NY (US)

(*) Notice: Subject to any disclaimer, the term of this patent is extended or adjusted under 35 U.S.C. 154(b) by 1158 days.

(21) Appl. No.: 17/332,653

(22) Filed: May 27, 2021

(65) Prior Publication Data

US 2022/0378456 A1 Dec. 1, 2022

(51) Int. Cl.
*A61B 17/30* (2006.01)
*A61B 17/00* (2006.01)
*A61B 90/00* (2016.01)

(52) U.S. Cl.
CPC .............. *A61B 17/30* (2013.01); *A61B 90/39* (2016.02); *A61B 2017/00367* (2013.01); *A61B 2017/00561* (2013.01); *A61B 2017/308* (2013.01); *A61B 2090/3966* (2016.02)

(58) Field of Classification Search
CPC ...... A61B 17/30; A61B 90/39; A61B 2017/00367; A61B 2017/00561; A61B 2017/308; A61B 2090/3966
See application file for complete search history.

(56) References Cited

U.S. PATENT DOCUMENTS

| | | | |
|---|---|---|---|
| 11,730,476 B2 * | 8/2023 | Rodriguez-Navarro | A61B 17/10 606/142 |
| 2003/0208185 A1 * | 11/2003 | Sheffer | A61B 17/00234 606/1 |
| 2010/0023024 A1 * | 1/2010 | Zeiner | A61B 17/0469 606/144 |
| 2016/0007748 A1 * | 1/2016 | Gasser | E05B 65/463 312/319.1 |
| 2017/0015219 A1 * | 1/2017 | Mosch | B60N 2/366 |
| 2018/0177925 A1 * | 6/2018 | Hu | A61M 1/86 |
| 2022/0096110 A1 * | 3/2022 | Bhatia | A61B 17/32002 |
| 2022/0226011 A1 * | 7/2022 | Sato | B25J 15/0683 |
| 2024/0180573 A1 * | 6/2024 | Kovarik | A61B 1/05 |

FOREIGN PATENT DOCUMENTS

| | | | | |
|---|---|---|---|---|
| CN | 110123440 A | * | 8/2019 | ......... A61B 18/1445 |
| CN | 111388034 A | * | 7/2020 | ......... A61B 17/0218 |
| CN | 117064497 A | * | 11/2023 | |
| EP | 1116554 A2 | * | 7/2001 | .......... B25B 11/007 |
| JP | 2002238913 A | * | 8/2002 | |
| RU | 2698029 C2 | * | 8/2019 | ............. A61B 1/303 |
| WO | WO-9746163 A1 | * | 12/1997 | ............. A61B 17/29 |
| WO | WO-2006041014 A1 | * | 4/2006 | ............. A61B 17/02 |
| WO | WO-2019222425 A1 | * | 11/2019 | ............. A61B 17/00 |

* cited by examiner

*Primary Examiner* — Daniel L Cerioni
*Assistant Examiner* — Kavya Shobana Balaji
(74) *Attorney, Agent, or Firm* — Inskeep IP Group, Inc.

(57) ABSTRACT

Disclosed herein is a tissue engaging surgical tool that is configured to selectively hold or grasp a portion of tissue with a suction cup or flexible end portion. The device is configured to increase or decrease pressure between the flexible end portion and tissue that the end portion is held against, thereby creating a releasable suction or vacuum force.

20 Claims, 11 Drawing Sheets

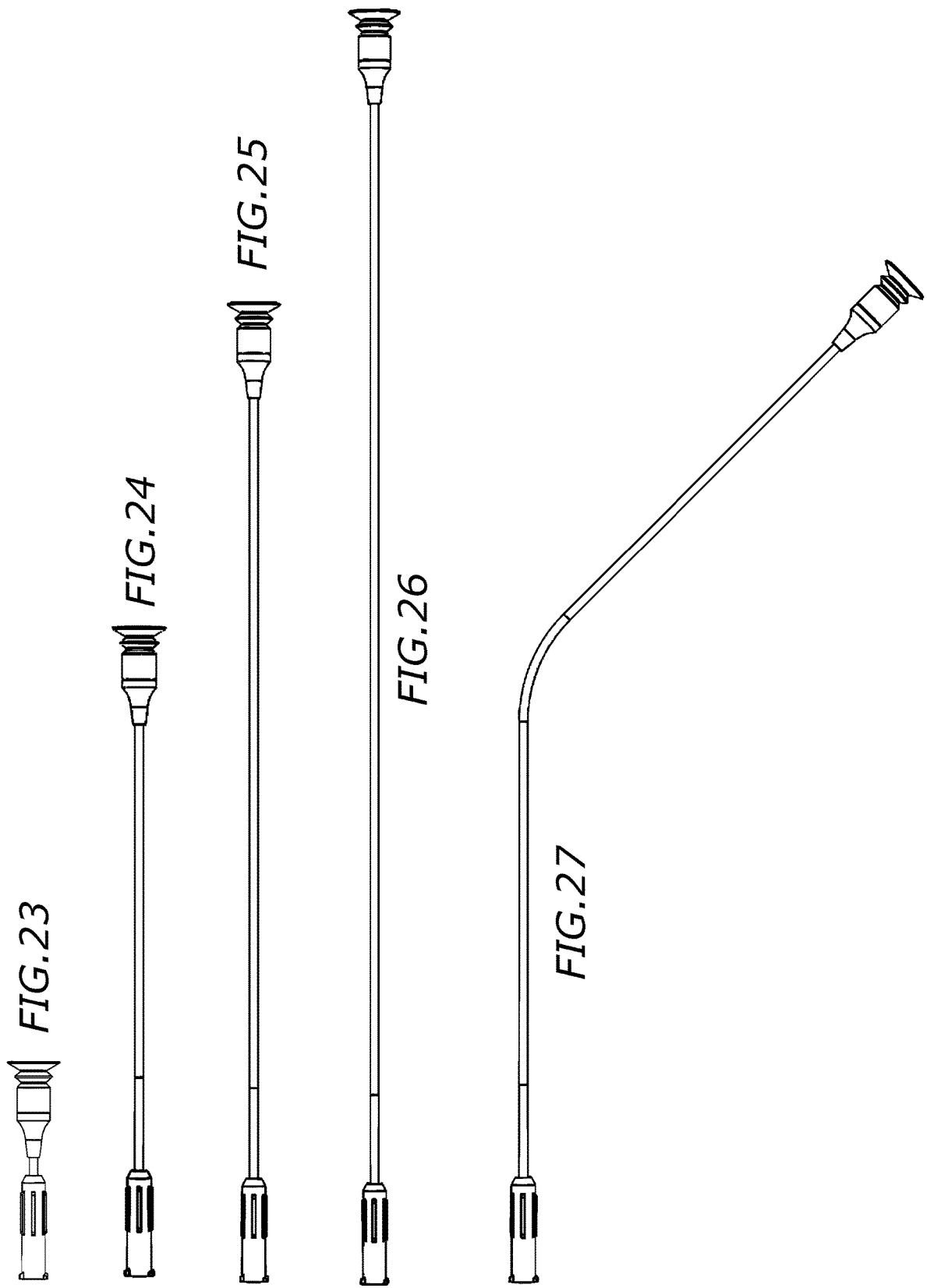

TISSUE ENGAGING SURGICAL TOOL

BACKGROUND OF THE INVENTION

Many surgical procedures require a surgeon to grasp, move, or otherwise manipulate portions of tissue within a patient. Typically, surgeons rely on their hands, forceps, tongs, and similar devices for tissue manipulation during the surgical procedure.

Depending on the location of the surgery, the tissue can be delicate and therefore easily damaged. Additionally, some regions of tissue can be relatively slippery, especially if they are covered in bodily fluids such as blood. Hence, surgical tools often require some degree of sharp or rough surfaces to achieve a desired grasp, but these surfaces can also lead to unwanted tissue damage. Current surgical forceps work by either grasping a small portion of the object by sharp toothed instruments which can lacerate or rupture the object, or by grasping the object on two sides with a blunt instrument which can cause compression damage.

Additionally, surgical tools such as forceps require the tool to grasp two sides of a portion of tissue or organ so that it can "pinch" its target. However, depending on the size, shape, and location of the tissue/organ, it can be difficult to open the forceps wide enough to properly grasp the tissue.

Therefore, there is a need for an improved tissue engaging device that can better grasp tissue and organs without causing tissue damage.

SUMMARY OF THE INVENTION

The present invention is generally directed to a tissue engaging surgical tool that is configured to selectively hold or grasp a portion of tissue with a suction cup or flexible end portion. The device is configured to increase or decrease pressure between the flexible end portion and tissue that the end portion is held against, thereby creating a releasable suction or vacuum force.

In one example, the device includes a housing containing a pressure adjustment mechanism. A proximal end of an elongated extension tube can be connected to the device so that it is in communication with the pressure adjustment mechanism, and a distal end of the elongated extension tube may include a suction cup.

In one example, the pressure adjustment mechanism may comprise a piston positioned within a piston housing.

In another example, the pressure adjustment mechanism may be configured to lock in one or more retracted positions so as to maintain a negative pressure at the suction cup.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which
FIGS. 23, 24, 25, 26, 27, and 28 are views an extension tube for a tissue engaging device.

DESCRIPTION OF EMBODIMENTS

Figure 1:
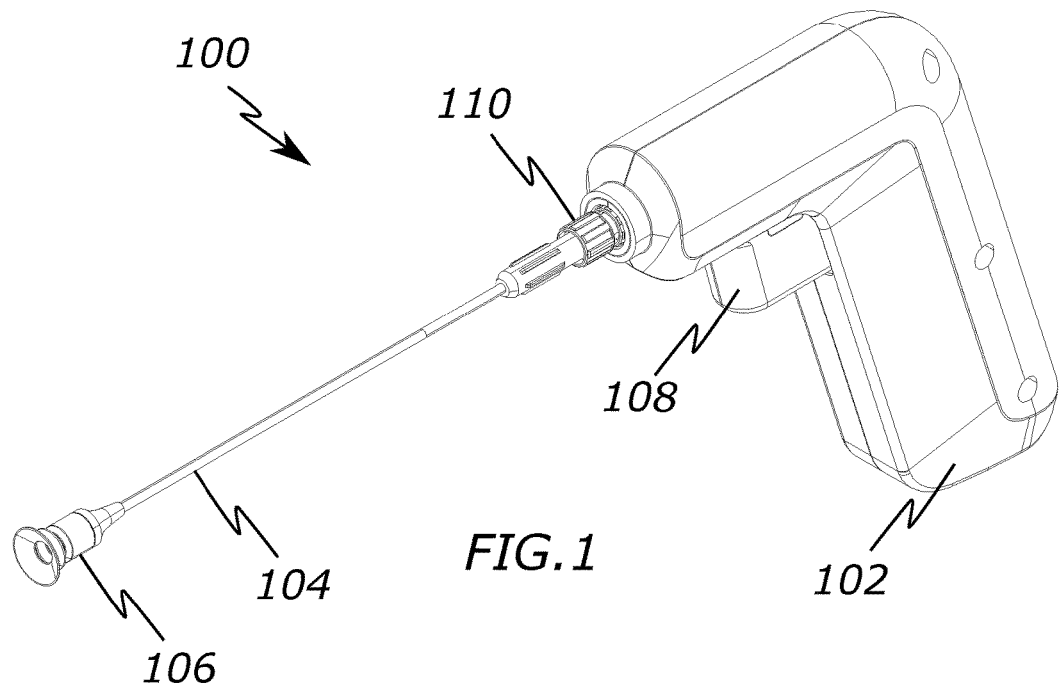
FIG. 1 is a perspective view of a tissue engaging device.
Figure 2:
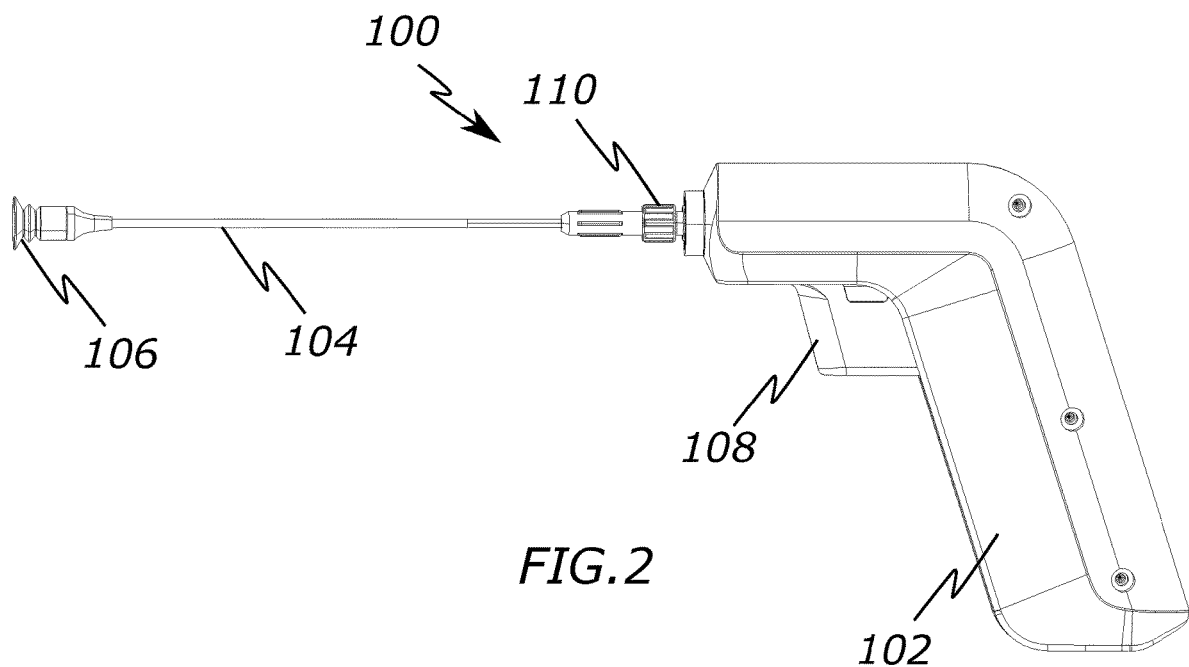
FIG. 2 is a side view of a tissue engaging device.
Figure 3:
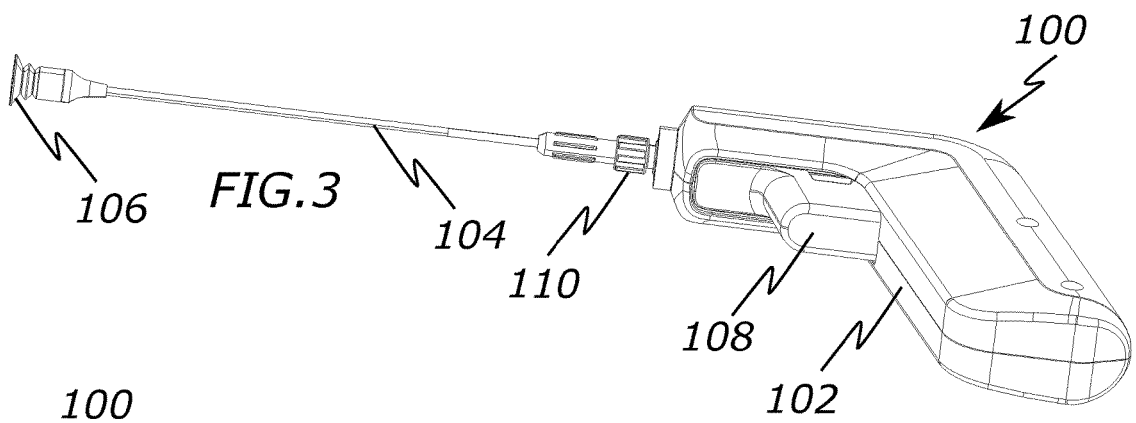
FIG. 3 is a lower view of a tissue engaging device.
Figure 4:
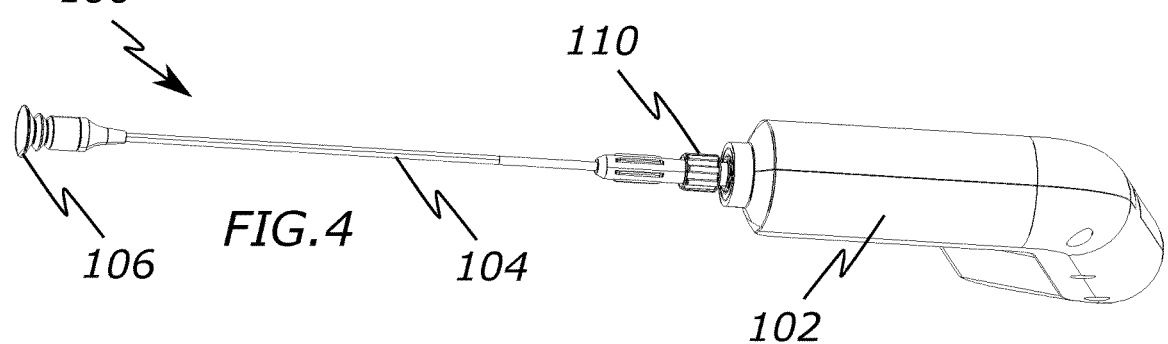
FIG. 4 is a top view of a tissue engaging device.
Figure 5:
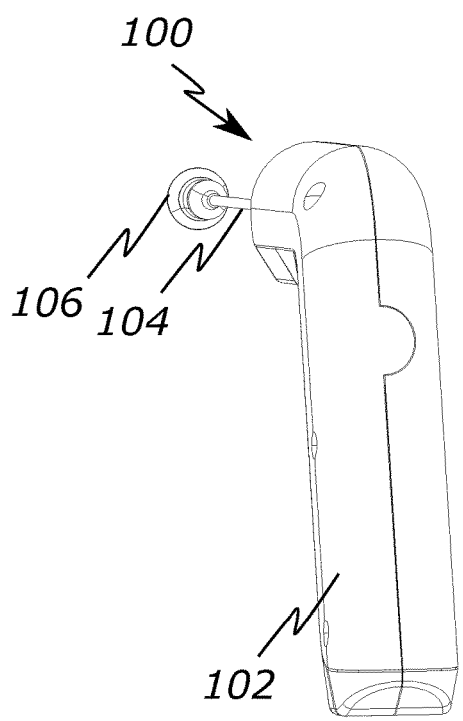
FIG. 5 is a back or proximal view of a tissue engaging device.
Figure 6:
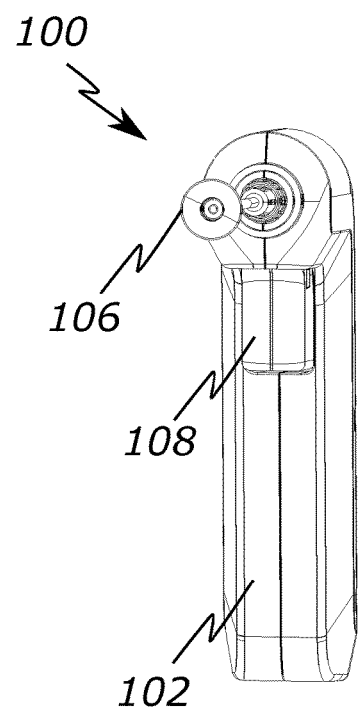
FIG. 6 is a front or distal view of a tissue engaging device.
Figure 7:
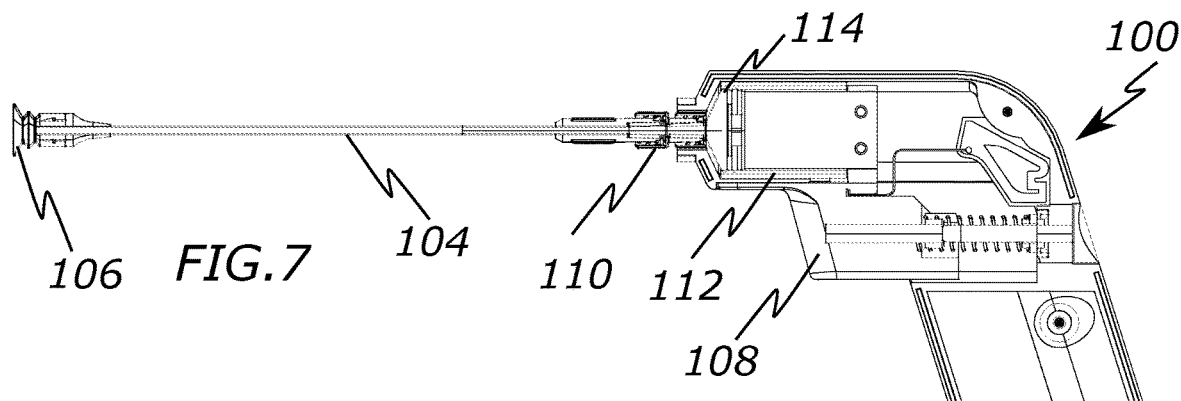
FIG. 7 is a cross sectional view of a tissue engaging device.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements. While different embodiments are described, features of each embodiment can be used interchangeably with other described embodiments. In other words, any of the features of each of the embodiments can be mixed and matched with each other, and embodiments should not necessarily be rigidly interpreted to only include the features shown or described.

The present invention is generally directed to a tissue engaging surgical tool that is configured to selectively hold or grasp a portion of tissue with a suction cup or flexible end portion. The device is configured to increase or decrease pressure between the flexible end portion and tissue that the end portion is held against, thereby creating a releasable suction or vacuum force.

FIGS. 1-6 illustrate one embodiment of a tissue engaging device 100 that is configured to selectively engage or disengage a suction cup 106 against an area of target tissue. While other surgical tools, such as forceps, engage tissue by pinching or pressing against opposing sides of the tissue, the present device 100 can engage tissue without the need to pinch or compress. Hence, a variety of different tissue surfaces, including relatively flat and convex surfaces, can be easily engaged. Additionally, surgical tools like forceps require a relatively high amount of force to be applied to the tissue to create friction engagement with target tissue, especially if that tissue is slippery from being coated with bodily fluid. In contrast, the suction cup 106 of the present invention provides a relatively larger area to distribute its suction force, thereby potentially causing less tissue damage to a target tissue area. Further, bodily fluids on the tissue act to enhance the seal created around the perimeter of the suction cup 106, further enhancing the engagement to the tissue.

The device 100 comprises a housing 102 that is preferably in the form of a handle, and an actuator or trigger 108 that actuates a pressure adjustment mechanism within the housing 102. A proximal end of an extension tube 104 is connected to the pressure adjustment mechanism and a distal end of the extension tube 104 is connected to a suction cup 106, such that changes in pressure within the pressure adjustment mechanism are conveyed through a passage of the extension tube 104 and to the suction cup 106. In an alternate embodiment the suction cup can be engaged by attaching the device to wall suction.

Hence, the user can press the suction cup 106 against an area of target tissue, actuate the trigger 108, and thereby decrease pressure between the suction cup 106 and the target tissue. The negative pressure between the suction cup 106 and the target tissue can be increased or returned to normal atmosphere by further actuating the pressure adjustment mechanism by pressing the trigger a second time or alternately by a separate pressure release valve mechanism.

Figure 19:
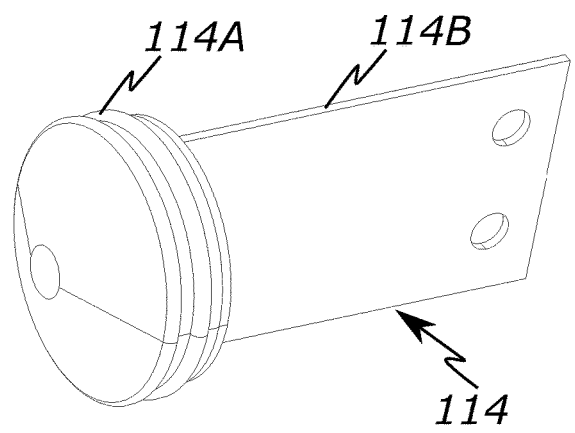
FIG. 19 is a view of a piston for a tissue engaging device.

In one example, the pressure adjustment mechanism comprises a piston 114 that moves within a piston housing 112, as seen in FIGS. 7 and 10-13. The piston housing 112 may have a generally cylindrical tubular shape with a distal end that decreases in diameter in a funnel shape towards a distal opening 112A. The piston 114, seen alone in FIG. 19, includes a piston head 114A having an outer diameter sized such that its outer diameter contacts the entire inner circumference of the inner passage of the piston housing 112 (e.g., circular or disc shaped). In one example, the piston head 114 may include one or more resilient circular seals or O-rings that are composed of compressible material (e.g., silicone or rubber) that seal with the inner passage of the piston housing 112. Alternately or additionally, the main body of the piston head 114A may also be composed of a resilient or compressible material (e.g., silicone or rubber) to help seal with the inner passage of the piston housing 112. Hence, as the piston head 114A is moved proximally backward within the piston housing 112, it decreases pressure within the piston housing 112 and through distal opening 112A.

The amount of pressure generated at a given position of the piston is at least partially dependent on the size or diameter of the piston head 114A and piston housing 112, as well as the travel length of the piston 114 within the piston housing 112. A larger piston head 114A and piston housing 112 (e.g., larger in width/diameter) will provide relatively larger amounts of pressure and may be desirable in some embodiments so long as the piston width does not obstruct the physician's view. In other embodiments, it may be desirable to allow the piston 114 to move a relatively greater distance longitudinally to provide a desired negative pressure. In that respect, a mechanism can be included between the trigger 108 and the piston 114 which changes the amount of longitudinal travel of the piston 114 and therefore the amount of negative pressure that is generated when the trigger 108 is depressed.

In an alternate embodiment, a separate suction device or source can be connected to the housing 102 to provide the suction force instead of the piston. In such an embodiment, the housing includes a mechanism to open and close the suction source along the path to the suction cup 106.

In one example, the piston 114 is configured to create a negative pressure at the suction cup 106 within an inclusive range of about 0.1 PSI to about 10. In another example, the piston 114 is configured to create a negative pressure at the suction cup 106 within an inclusive range of about 1 PSI to about 7 PSI. In another example, the piston 114 is configured to create a negative pressure at the suction cup 106 within an inclusive range of about 1 PSI to about 5 PSI. It should be understood that too little pressure will prevent the suction cup 106 from sticking and too much pressure can cause tissue damage.

The piston 114 also includes a back extension portion 114B that is connected to a proximal back side of the piston head 114A and is further connected to the trigger 108, as discussed later in this specification.

The distal opening 112A of the piston tube 112 is connected to or is in communication with the interior passage of the extension tube 104. While the extension tube may be permanently fixed to the housing 102 and/or piston tube 112, preferably a connection mechanism 110 is included so that the extension tube 104 can be removed and replaced as desired.

Figure 21:
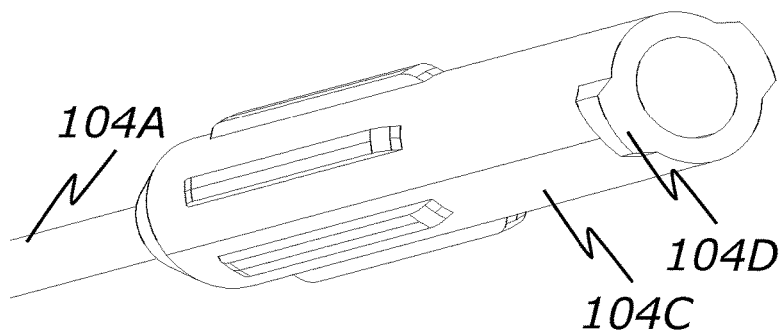
FIG. 21 is a view of an extension tube for a tissue engaging device.
Figure 22:
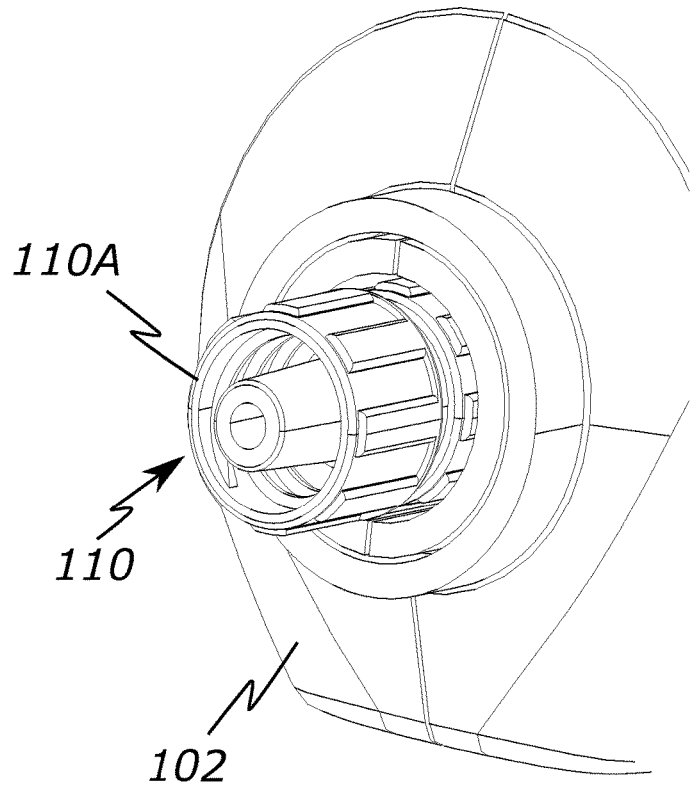
FIG. 22 is a view of a connector mechanism for a tissue engaging device.

In one example seen best in FIGS. 7, 9, 13, and 22, the connection mechanism may be a screw-clamp mechanism (e.g., a Luer lock or Tuohy Borst connector). The connector 110 includes an outer cylinder or cap 110A with inner threads. The proximal end portion 104C of the extension tube 104 includes two or more radial features 104D that extend radially outward, as seen in FIG. 21. When the proximal end portion 104C is placed within the cap 110A and the cap 110A is rotated, the threads engage the radial features 104D, which are shaped to engage the inner threads of the cap 110A. As the cap 110A is further rotated, is pulls the proximal opening of the proximal end portion 104C against the passage of the connector 110, thereby creating a sealed passageway.

Figure 15:
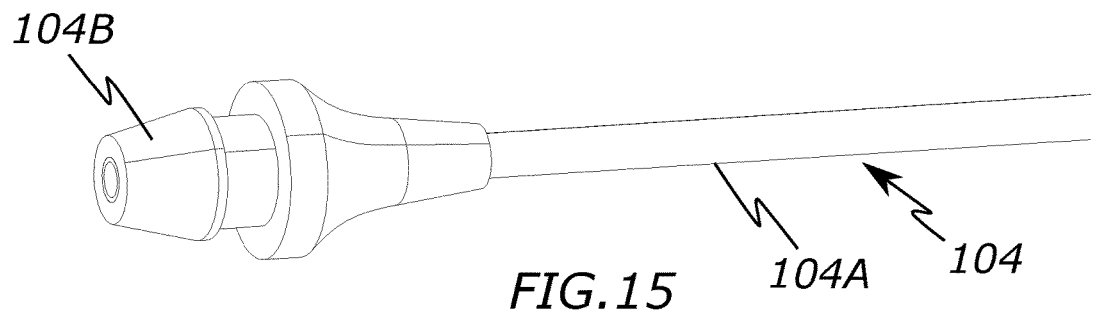
FIG. 15 is a view of an extension tube for a tissue engaging device.
Figure 16:
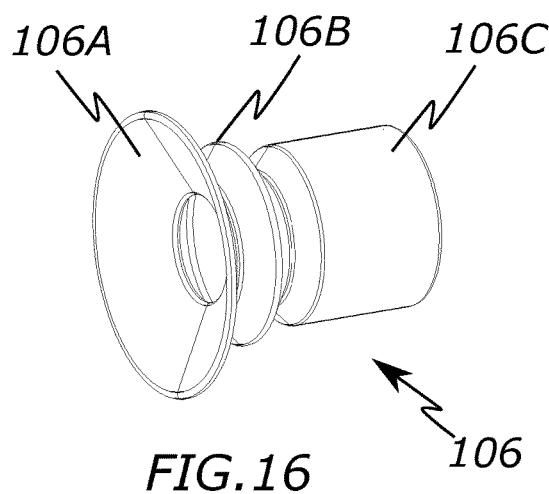
FIG. 16 is a view of a suction cup for a tissue engaging device.
Figure 17:
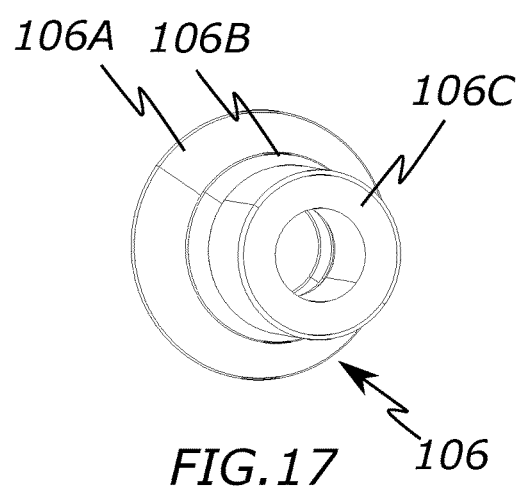
FIG. 17 is a view of a suction cup for a tissue engaging device.
Figure 18:
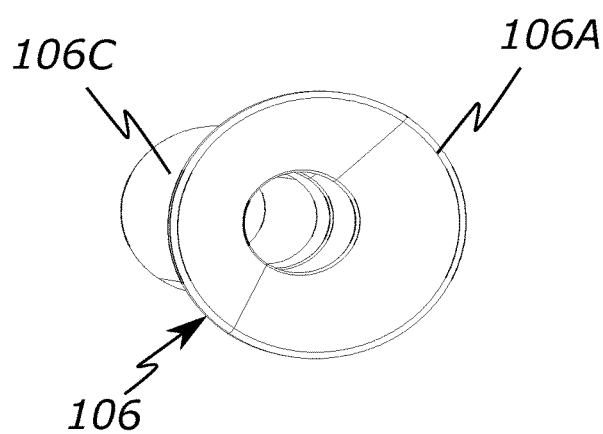
FIG. 18 is a view of a suction cup for a tissue engaging device.
Figure 20:
FIG. 20 is a view of an extension tube for a tissue engaging device.

As seen best in FIGS. 15, 20, and 21, the extension tube 104 comprises a tube 104A with the previously discussed proximal end portion 104C for connecting to the housing 102, and with a distal end portion 104B for connecting to the suction cup 106. The tube 104A can be composed of a polymer or metal (e.g., stainless steel) that is suitable for being sterilized. The distal end portion 104B can include a shape configured to connect to an internal passage of the suction cup 106. For example, the distal end portion 104B can have a conical shape that increases in diameter proximally and then abruptly decreases in diameter so as to create a barb shape. This barb shape allows the suction cup 106 to be easily pushed over the barb without easily being removed.

Alternately, the distal end portion 104B can have a connection mechanism, such a Luer lock style clamping mechanism similar to connector 110, use to connect the suction cup 106. This may provide a more secure connection to help avoid the possibility of the suction cup 106 falling off during a procedure.

As seen in FIGS. 23-27, the extension tube 104 can have different lengths and bend angles. For example, the extension tube 104 can have a length in a range inclusive of 11 to 28 cm, excluding the suction cup 106 but including the proximal portion 104C. In another example, the extension tube 104 may have an angular bend at any location along its length (e.g., near its middle, near its proximal end, or near its distal end) and the bend may be selected from a range inclusive of 0 degrees to 90 degrees. For example, FIG. 23 illustrates an extension tube 104 with a length of about 3 cm, FIG. 24 illustrates an extension tube 104 with a length of about 11 cm, FIG. 25 illustrates an extension tube 104 with a length of about 20 cm, FIG. 26 illustrates an extension tube 104 with a length of about 30 cm, and FIG. 27 illustrates an extension tube with a length of about 20 cm and bend of about 45 degrees near its middle.

Figure 28:
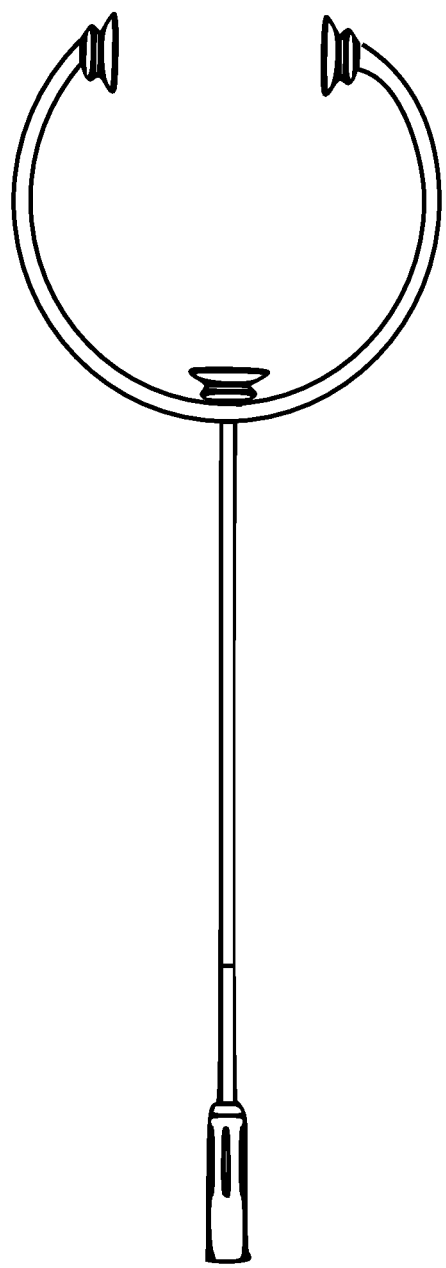

As seen in FIG. 28, the extension tube 104 can also include a plurality of suction cups 106. In one example, the tube 104A branch off into two or more curved tubes which each have their own suction cup 106 at their ends. The tubes and suction cups 106 can be configured to directly oppose each other (e.g., face about 90 degrees relative to an axis of the tube 104A) or may be angled somewhat proximally or distally. Two, three, four, five, and six tubes and suction cups can be configured. Optionally, as seen in the figure, a suction cup 106 can be placed at the base of the split area of the tubes, pointing distally. All of these configurations can be helpful for grasping an object on several different sides. In some embodiments, the branched tubes may be flexible and configured to move the suction cups 106 closer to and away from each other to performs a pinching movement.

The extension tube 104 may also include one or more radiopaque markers that may help located it if it becomes disconnected from the housing 102 while within a patient. The radiopaque markers may include one or more bands at the proximal and distal ends of the extension tube 104 if it is composed of plastic or similar material. Alternate, the extension tube 104 may be composed of a metal that is already radiopaque and therefore markers may not be needed in that case.

Figure 8:
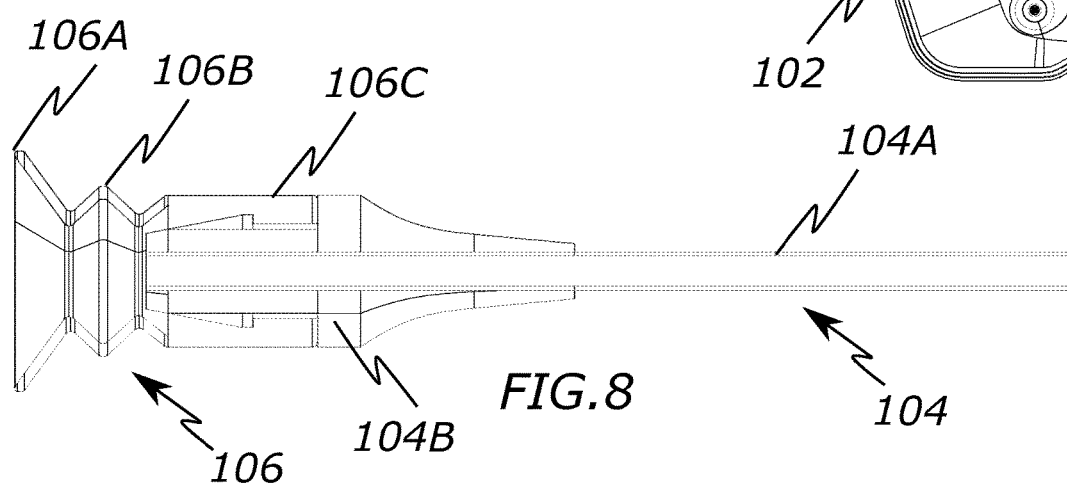
FIG. 8 is a cross sectional view of an extension tube and suction cup.
Figure 9:
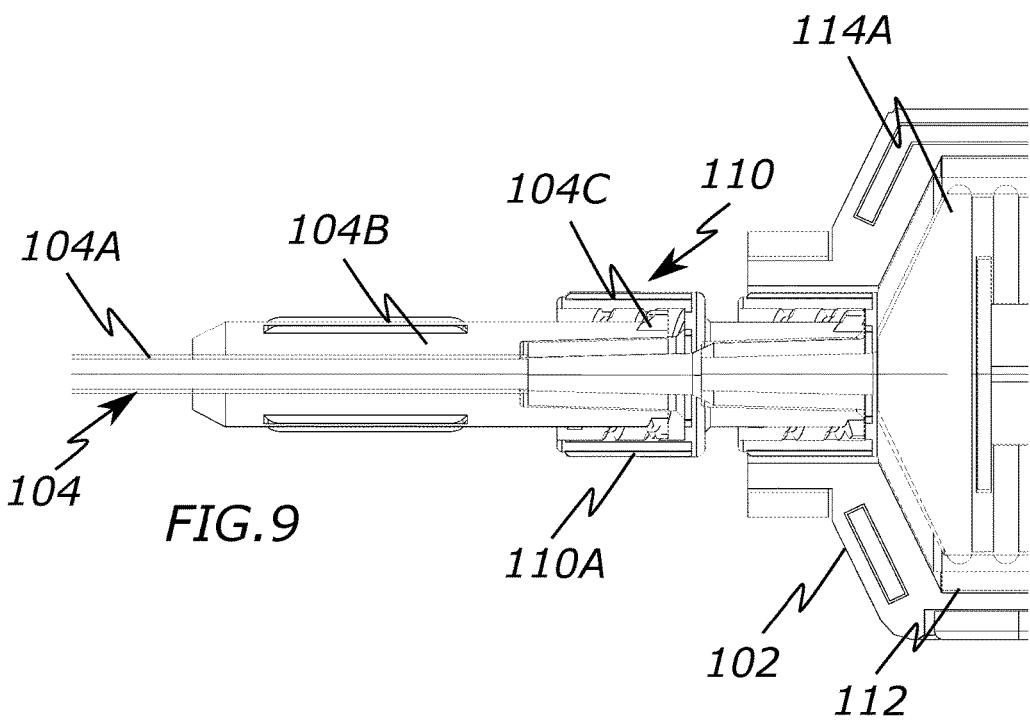
FIG. 9 is a cross sectional view of a connector mechanism for an extension tube.
Figure 10:
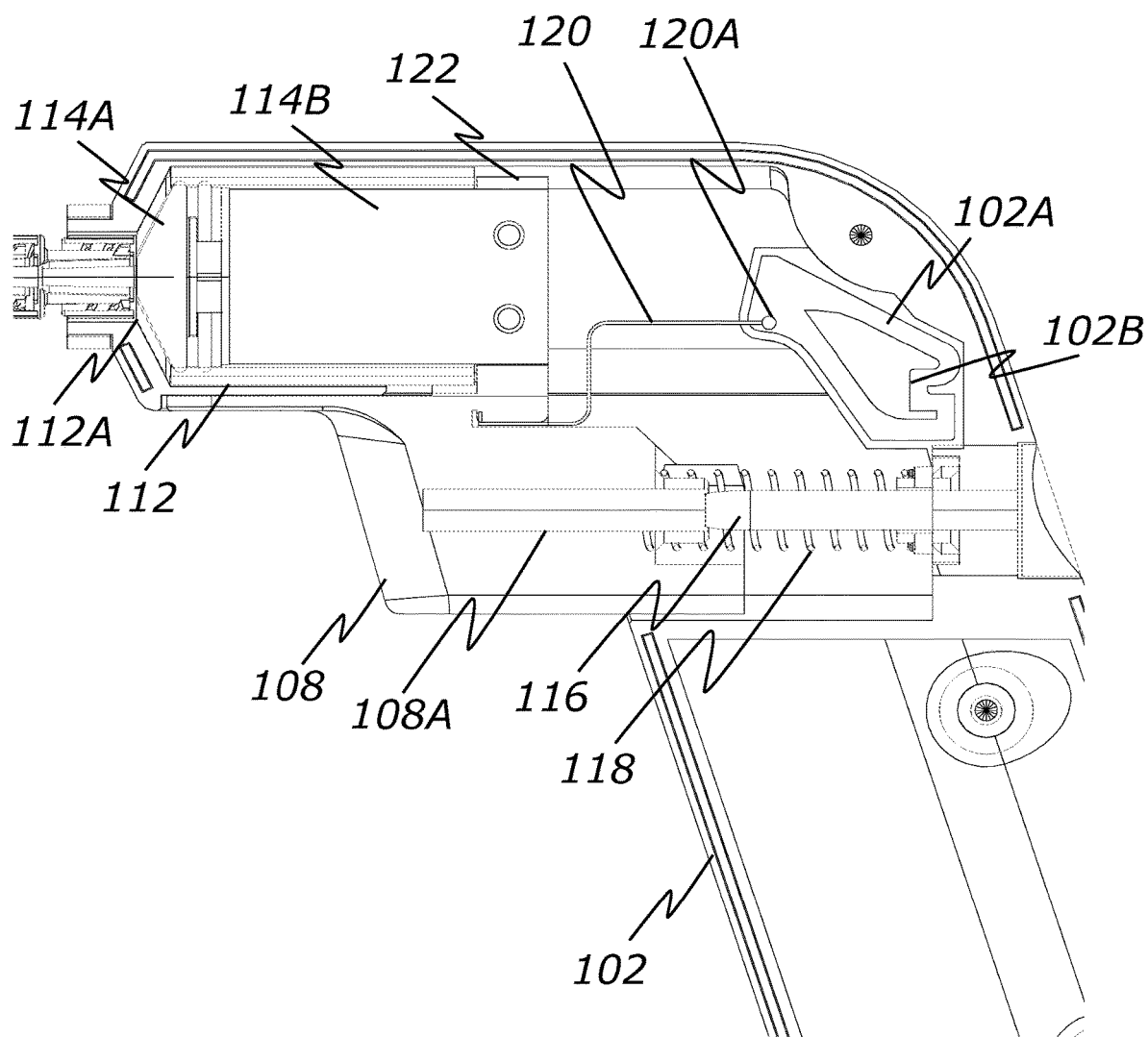
FIG. 10 is a cross sectional view of a housing for a tissue engaging device.
Figure 11:
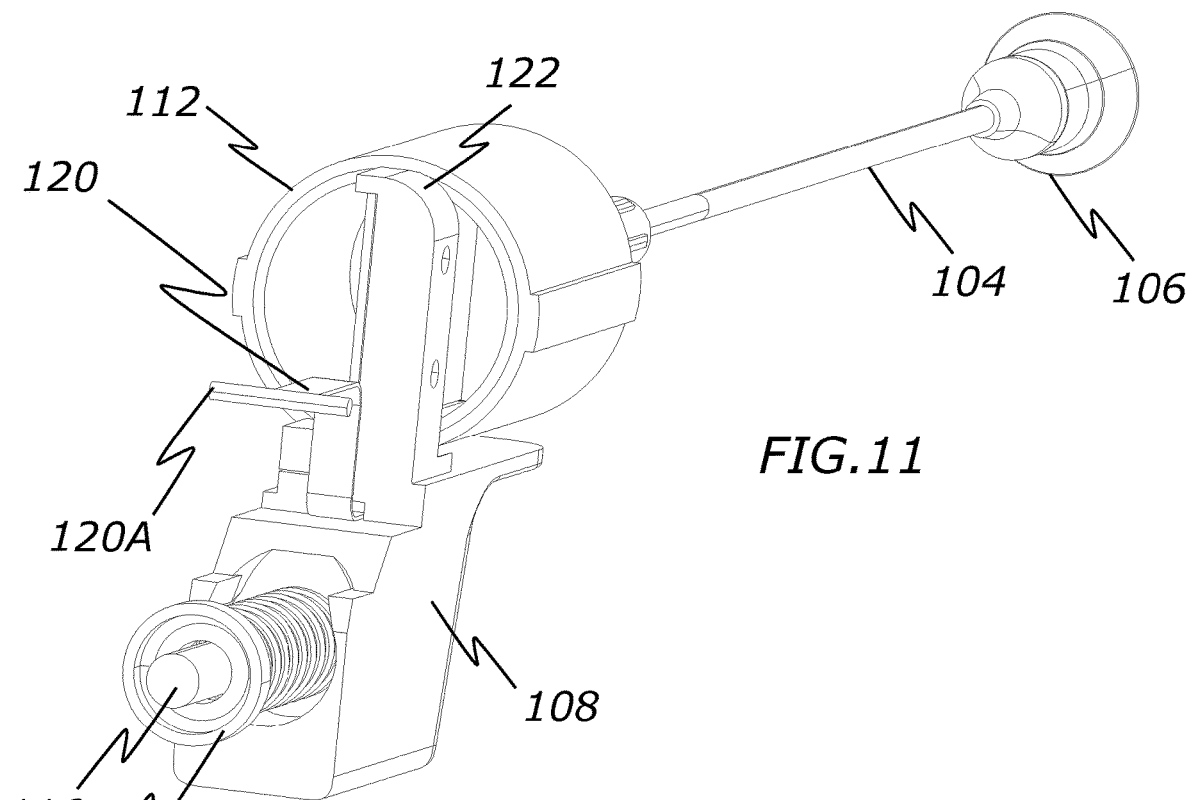
FIG. 11 is a view of several interior components of a tissue engaging device without an outer housing.
Figure 12:
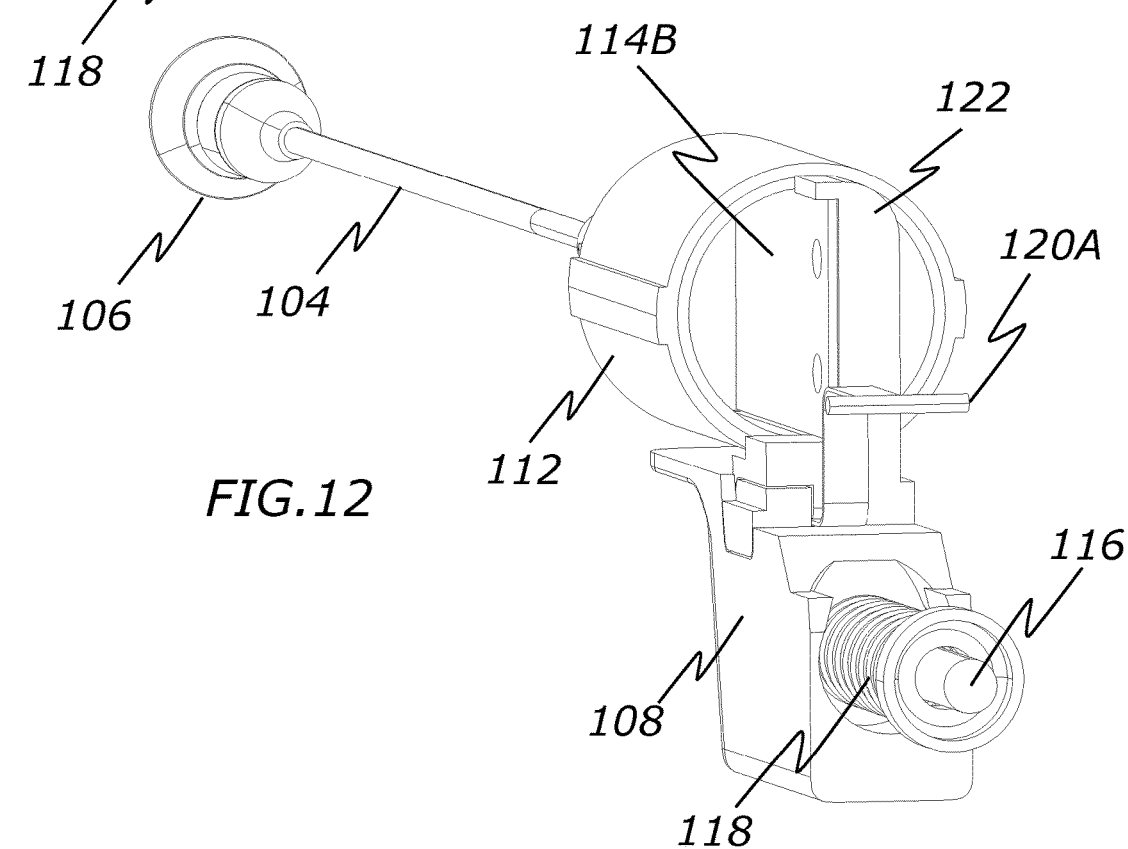
FIG. 12 is a view of several interior components of a tissue engaging device without an outer housing.
Figure 13:
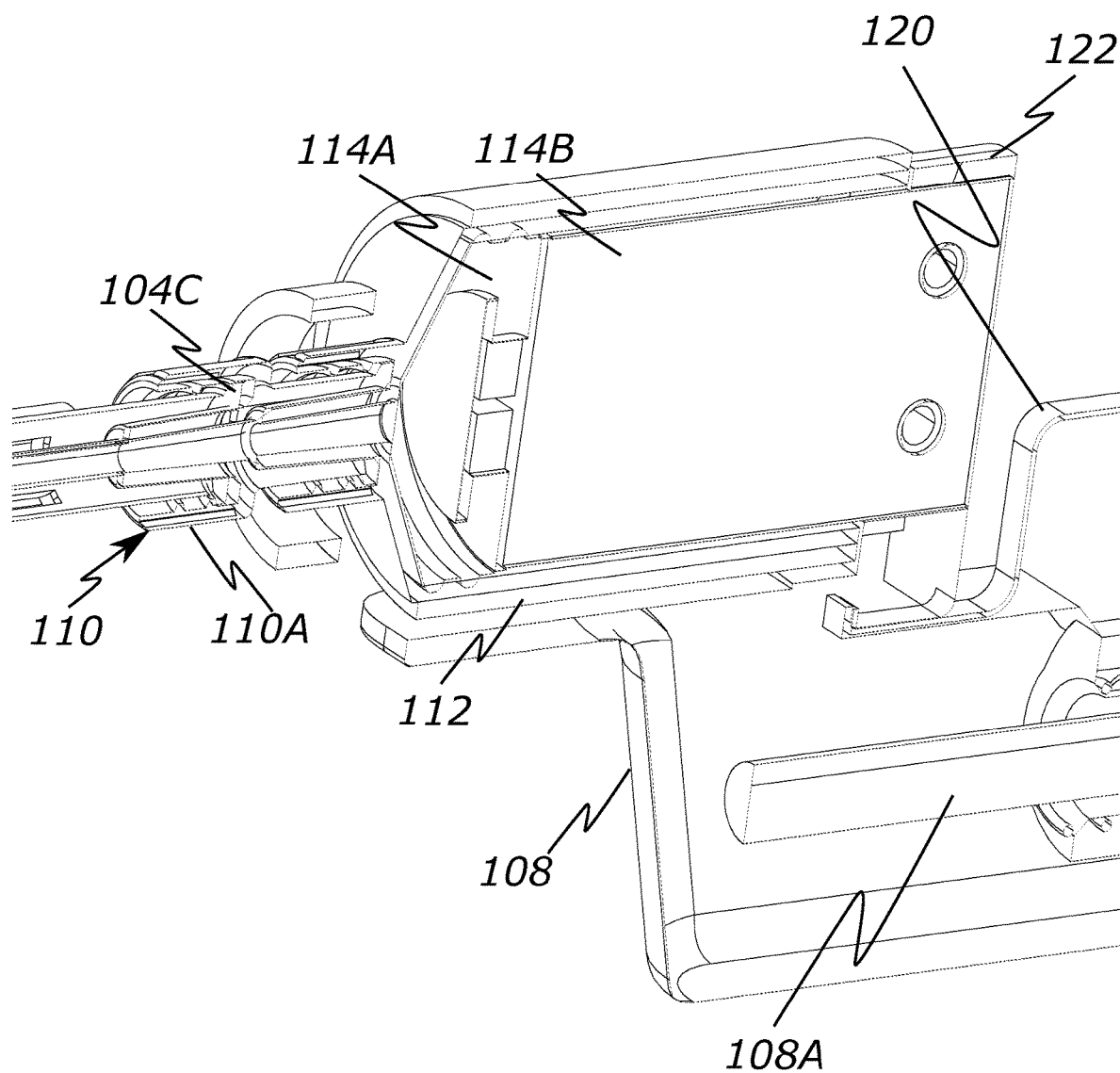
FIG. 13 is a cross sectional view of a housing of a tissue engaging device.
Figure 14:
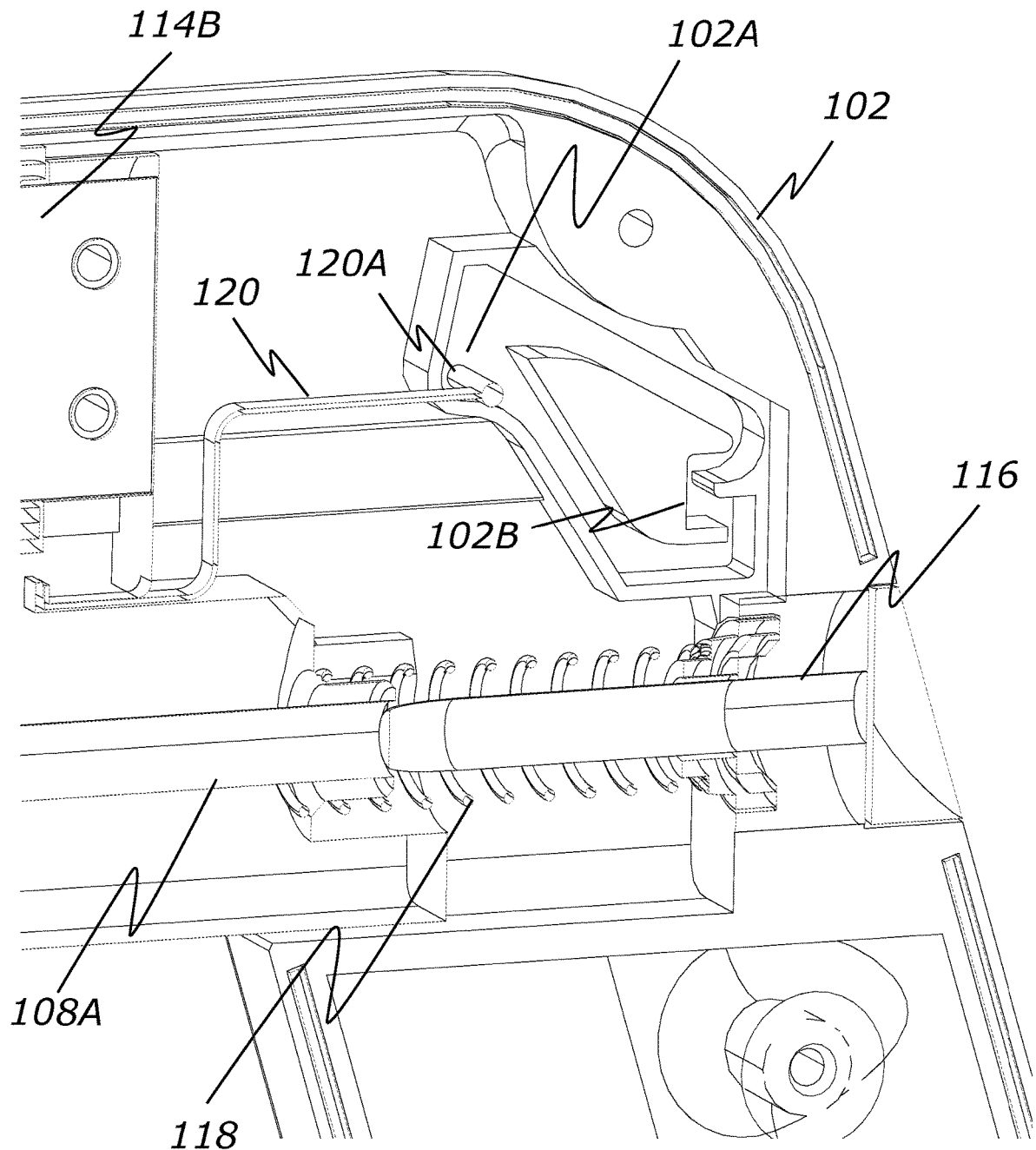
FIG. 14 is a cross sectional view of a housing of a tissue engaging device.

The suction cup 106 preferably is configured to connect or position over the distal portion 104B of the extension tube 104 and includes features to create a seal with adjacent tissue. One specific example is seen in FIGS. 8 and 16-18, which includes a proximal body 106C, a middle compressible region 106B, and a radially flanged cup portion 106A. The proximal body 106C preferably includes an internal passage that is sized and shaped to mate with the distal barb of the distal portion 104B of the extension tube 104, as seen in FIG. 8. The suction cup 106 can be configured to be removed and replaced on the barbed end of the distal portion 104B or can be permanently attached to the barb to prevent accidentally falling off during a procedure and being left in a patient.

The middle compressible region 106B is optionally configured to longitudinally compress a relatively small amount so as to help decrease any abrupt contact with the target tissue. For example, the middle compressible region 106B can form proximally increasing and then decreasing diameter surfaces that create a radial lip or edge. As longitudinal compression occurs, the region 106B can increase in diameter to accommodate the compression.

The radially flanged cup portion 106A is shaped to create a cavity when pressed against a target tissue. For example, the cup portion 106A can be concave and circular in diameter. However, other shapes are also possible, depending on the target tissue and location. For example, the cup portion 106A may have a square, rectangular, or asymmetrical shape. The cup portion 106A may also have a variety of different sizes. For example, the cup portion 106A may have a diameter within an inclusive range of about 1 to 10 cm. The cup portion 106A (or all of the suction cup 106) may be composed of different durometer materials, allowing the user to select a different firmness as desired. A softer material may be more appropriate for delicate tissue relative to a harder material, but a software material may provide more "give" or inward movement that may reduce the strength of the suction.

The suction cup 106 can have a passage extending completely between its proximal and distal end and which is connected to the passage of the extension tube 104. In this respect, the piston 114 and piston chamber 114 are in communication through the extension tube 104, through the suction cup 106, and to the surface of the target tissue. In such a configuration, it may be helpful to include a filter within this communication passage, such as within the passage of the suction cup 106 or within the passage of the extension tube 104.

Alternately, the radially flanged cup portion 106A may be completely closed off from its passage extending from its proximal end. In this manner, pressure changes from the passage of the suction cup 106 are communicated through the barrier and to the cup portion 106A. In other words, any barrier in the passage of the suction cup passage is thin enough to substantially transmit pressure changes to the cavity created with the target tissue.

The suction cup 106 may have one or more radiopaque features so that it can be easily found if it falls off the device in a patient during a procedure. For example, the material of the suction cup 106 can include or be impregnated with a radiopaque material (e.g., a metal such as tungsten). Alternately, a radiopaque band or collar can be placed around the outside of the suction cup 106 (e.g., the proximal portion 106C) or embedded within the material of the suction cup 106 (e.g., within the wall of the proximal portion 106C).

The device 100 preferably includes a mechanism that allows the vacuum or suction pressure to be easily created and easily released. In one example, this is achieved by a releasable trigger mechanism, seen best in FIGS. 10-13. The trigger mechanism comprises a trigger 108 that is positioned near an upper portion of the handle region of the housing 102 and is configured to slide partially into and out of housing 102. The trigger 108 is biased to its outward or distal-most position by a spring 118 that is positioned within the housing and against the trigger 108. The spring 118 may be positioned around an alignment post 116 that helps maintain the alignment and position of the trigger 108 as it is retracted and released. Specifically, the alignment post 116 is positioned towards an alignment passage 108A in the trigger 108 such that as the trigger 108 is retracted, the passage 108A moves over the post 116.

The trigger 108 is further connected to the piston 114 such that as the trigger is 108 is retracted or pulled into the housing 102, it also moves the piston 114 proximally or toward a back side of the housing 102 so that negative pressure or a vacuum pressure can be created. In one example, a lower end of an elongated, vertical connecting member 122 is fixed to a top of the trigger 108 and an upper end of the connecting member 122 is further fixed to a side of the extension portion 114B of the piston 114.

The trigger mechanism may also include a mechanism to lock and release the position of piston 114 and optionally the trigger 108. This allows the user to engage tissue and maintain a constant negative pressure value at the suction cup 106, thereby consistently maintaining the engagement force with the tissue. When desired, the locked piston 114 can be released to thereby release the target tissue.

In one example, the lock and release mechanism, seen best in FIGS. 10-14, includes a trigger spring 120 that follows a guide path within the housing. Since the trigger spring 120 is fixed to the trigger 108 (or alternately the piston 114), depressing the trigger 108 causes trigger spring 120 to move within the guide path between a location that locks the trigger in a depressed position and a location that releases the depressed position of the trigger 108.

Specifically, the guide path can be formed of a plurality of walls along one side of the housing 102 (e.g., perpendicular to a side surface of the side housing wall), allowing a pin 120A on the proximal end of the trigger spring 120 to be positioned and move within. In one example, the guide path forms a loop (best seen in FIG. 14), that extends between a distal, released position 102A and a proximal, locked position 102B. Hence, when the pin 120A is positioned in the distal, released position 102A, the trigger 108 is fully extended out from the housing 102 and the piston 114 is positioned in a distal position.

As the trigger 108 is retracted into the housing 102 from its fully outwardly extended position, the trigger spring 120 moves the pin 120A along the downward slope of the path and to the lower, distal position of the guide path. Since the trigger spring 120 biases its pin upwards (e.g., because it has an upward 90-degree curve), the pin 120A moves up into the proximal, locked position 102B. The locked position may form a distally positioned region or recess so that as the user releases the trigger 108, the spring 118 pushes the trigger 108 and therefore also pulls the pin 120A into the recess. In other words, the pin 120B becomes biased into the distally positioned region or locked position 102B, thereby maintaining the trigger 108 and piston 114 in their retracted position.

Further retracting and releasing the trigger 108 moves the pin 120A upward and out of the distally positioned region or locked position 102B, allowing the bias of the spring 118 to move both the trigger and the pin 120A forward and back to the distal, released position 102A of the guide path. Hence, the trigger spring 120 and its pin 120A can follow the guide path between the two positions 102A and 1028, thereby locking and unlocking the piston 112 from a proximally retracted position.

Other alternatives to the lock and release mechanism are also possible. For example, the guide path may include 2, 3, or 4 different locked positions 1028 that are each located at different distances from the proximal end of the device. This may allow the user to lock the trigger 108 and therefore the position of the piston 114 at various locations, thereby creating different levels of negative pressure. This can be achieved by providing a similar guide path design as shown in the figures, except with several different "loops" that are all connected together with common upper and lower paths (e.g., a figure-8 shape for two different locking positions 102B).

In another example, the guide path shown in the figures may be located on a sliding side panel that can slide and lock at various longitudinal positions between the proximal and distal ends of the housing 102. Hence, depending on where the plate was positioned (e.g., via a sliding lever extending from the housing) the level of pressure achieved by the piston 114 can be changed. Additionally, various indicia indicating approximate pressure levels or tissue types may be positioned along the sliding lever, helping to indicate to the user an appropriate position and pressure level for the piston 114.

In another example, the locking pin 120A of the trigger spring 120 can engage one of an array of notches linearly arranged between the proximal and distal ends of the housing 102. In another example, the device 100 may have a separate release button or lever to release the locking pin 120A from the locking position 1026.

In operation, the user may first select a desired extension tube 104 that is sized and shaped for a particular procedure (e.g., FIGS. 23-27). In some examples, a kit is provided with several different extension tubes 104, together or separate from the device 100. Once the extension tube 104 is selected, the user may connect the extension tube 104 to the device 100 via the connector 100 by placing its proximal portion 104C adjacent to the connector 110 and rotating the screw cap 110A until a tight connection has be achieved. If a suction cup 106 is not already present on the distal portion 1046 of the extension tube 1046, its proximal portion 106C can be positioned over the barb of the distal portion 1046.

When the user wishes to engage tissue, the cup portion 1066 of the suction cup 106 is placed against the tissue such that contact is made entirely around the cup portion 106B to create a chamber. Next, the user pulls or retracts the trigger 108 into the housing 108, causing the piston 114 to move proximally within the piston tube 112. The movement of the piston 114 decreases pressure within the piston housing 108, within the lumen of the extension tube 104, within the passage of the suction cup 106, and in the space between the cup portion 1066 and the target tissue.

The pin 120A of the trigger spring 120 follows the guide path within the housing to a locked position 102B (e.g., a notch or recess), locking the position of the piston 114 in its proximally retracted position, thereby maintaining engagement with the target tissue. When the user wishes to release the tissue engagement with the suction cup 106, the trigger 108 is further retracted or pressed into the housing 102, causing the pin 120A of the trigger spring 120 to be released from the proximal locked position 102B to the distal released position 102A.

In one embodiment, the entire device 100 and all of its components are constructed so as to be sterilizable. For example, many components can be composed of stainless steel or similar materials that may withstand the relatively high temperatures of autoclaves and similar sterilization machines.

Alternately, the entire device 100 may be manufactured and constructed to be used during only a single procedure, and therefore is packaged sterilized for a physician. In such a configuration, the suction cup 106 may be unitary and nonremovable from the extension tube 104. And further, the extension tube 104 may be nonremovable from the housing 102 or may be removable and included with a several different sized extension tubes 104, as previously discussed.

Alternately, only a portion of the device 100 may be manufactured and constructed to be sterilized. For example, only the housing 102 and the components within it are configured for sterilization and therefore the relatively high temperatures used in sterilization. In such a configuration, the extension tube 104 and/or the suction cup 106 may be removable and configured for a one-time use. Either of these components may include a radiopaque marker on them and/or a tether (e.g., a wire) connected between one or more of the components and the housing 102 or other portion of the device 100. Hence, if the suction cup 106 or extension tube 104 falls off within the patient during a procedure, it can be easily found and/or withdrawn.

In another embodiment, the device 100 may be attached to a second surgical instrument. For example, the device 100 may include a bracket or similar holding mechanism that allows attachment of another device used during a procedure, or may non-removably integrate a second device into the suction device 100. Examples of secondary devices include a surgical telescope, an ultrasound transducer, a laser surgical instrument, a cauterization tool, or a suture/stapling mechanism.

In another embodiment, the device 100 may include one or more sensors. For example, one or more sensors can be located at or near the suction cup 106 and wires can extend through the extension tube 104, into the housing 104, and optionally out an electrical connector on the housing 102 so that it can be connected to an external monitor or display. Example sensors may include a pressure sensor configured to sense pressure within the suction cup, a temperature sensor configured to sense tissue temperature, or an EKG sensor.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A surgical device for grasping tissue, comprising:
   a housing;
   a piston assembly positioned within the housing and configured to create a suction force;
   an extension tube connected to the housing and having an interior passage in communication with the piston assembly;
   a suction cup connected at a distal end of the extension tube;
   wherein the piston assembly is configured to communicate the suction force through the interior passage of the extension tube and to the suction cup;
   a trigger connected to the housing; and
   a locking element received within a loop-shaped guide path, wherein:
   depressing the trigger a first time causes the locking element to move from an unlocked position within the loop-shaped guide path, in which the piston assembly is freely movable, to a locked position within the loop-shaped guide path in which the piston assembly is immovable irrespective of whether the suction cup is in contact with tissue by moving through a first portion of the loop-shaped guide path, wherein the locking element is suspended on a first trigger spring that follows the locking element around the loop-shaped guide path, the first trigger spring connecting the trigger to the locking element;
   wherein a second trigger spring is least partially received within the trigger and extends from the trigger into the housing; and
      depressing the trigger a second time causes the locking element to move from the locked position to the unlocked position by moving through a second portion of the loop-shaped guide path that is different from the first portion.

2. The surgical device of claim 1, wherein the extension tube is removably connectable to the housing.

3. The surgical device of claim 1, wherein the suction cup is removably connected to the extension tube.

4. The surgical device of claim 1, wherein the trigger is configured to manipulate the piston assembly to increase or decrease the suction force.

5. The surgical device of claim 1, wherein the locking element is a pin attached to a trigger spring connected to the trigger.

6. The surgical device of claim 1, wherein the extension tube is straight.

7. The surgical device of claim 1, wherein the extension tube branches into two or more tubes that each have a suction cup disposed on their distal ends.

8. The surgical device of claim 1, wherein the extension tube includes a straight portion and a curved portion angled between about 0 to 90 degrees.

9. The surgical device of claim 1, wherein the extension tube has a length in a range inclusive of 11 to 28 cm.

10. A kit for grasping tissue, comprising:
    a surgical device having a housing, a piston assembly positioned within the housing and configured to create a suction force, and,
    a plurality of extension tubes that are each separately connectable to the housing, that each have an interior passage in communication with the piston assembly, and that each have one or more suction cups connected at a distal end of the extension tube, wherein each of the one or more suction cups includes a distal cup portion and a proximal body portion defining a lumen in communication with the interior passage of the extension tube, and wherein each of one or more suction cups includes a barrier closing off the distal cup portion from the lumen;
    wherein the piston assembly is configured to communicate the suction force through the interior passage of a connected extension tube and to the lumen extending through the distal cup portion of each of the one or more suction cups;
    a trigger connected to the housing;
    a locking element received within a guide path, the guide path forming a polygonal closed-loop shape, wherein the locking element is located on an end of a first trigger spring that follows the locking element around the guide path, and a second end of the first trigger spring is received within the trigger;
    wherein a second trigger spring is least partially received within the trigger, the second trigger extending from the trigger into the housing parallel to at least a portion of the first trigger spring; and wherein:
    depressing the trigger a first time causes the locking element to move from an unlocked position within the guide path, in which the piston assembly is freely movable, to a locked position within the guide path in which the piston assembly is immovable irrespective of whether each of the one or more suction cups are in contact with tissue by translating along a first length of the guide path; and
    depressing the trigger a second time causes the locking element to move from the locked position to the unlocked position by translating along a second length of the guide path, the first length and the second length collectively forming the polygonal closed-loop shape.

11. The surgical device of claim 10, wherein the plurality of extension tubes each have a different length within a range inclusive of 11 to 28 cm.

12. The surgical device of claim 10, wherein some of the plurality of extension tubes include a straight portion and a curved portion angled between about 0 to 90 degrees.

13. The surgical device of claim 10, wherein some of the plurality of extension tubes branch into two or more tubes that each have a suction cup disposed on their distal ends.

14. The surgical device of claim 10, further comprising a lock and release mechanism within the housing, the lock and release mechanism configured to lock the piston assembly in a first position when a trigger connected to the housing is depressed, and unlock the piston assembly from the first position to a second position when the trigger is depressed a second time.

15. The surgical device of claim 10, wherein the plurality of extension tubes each have a clamp assembly that allows removable connection to the housing.

16. The surgical device of claim 10, wherein the one or more suction cups include a radiopaque marker.

17. The surgical device of claim 5, further comprising a spring located between the trigger and the housing, wherein the spring is configured to bias the trigger into a distal-most position and help retain the locking element within a recess of the loop-shaped guide path when the locking element is in the locked position.

18. The surgical device of claim 5, wherein the loop-shaped guide path is defined by the housing and includes a downward slope extending between an upper most point and a lower most point of the loop-shaped guide path.

19. The surgical device of claim 10, wherein each of the one or more suction cups includes a middle compressible portion located between the distal cup portion and the proximal body portion, the middle compressible portion defining a chamber in communication with the lumen of the proximal body portion.

20. A surgical device for grasping tissue, comprising:
  a housing;
  a piston assembly positioned within the housing and configured to create a suction force;
  an extension tube connected to the housing and having an interior passage in communication with the piston assembly;
  a suction cup connected at a distal end of the extension tube, wherein the suction cup includes a distal cup portion and a proximal body portion defining a lumen in communication with the interior passage of the extension tube, and wherein the suction cup includes a barrier completely closing off the distal cup portion from the lumen, wherein the barrier is configured to communicate pressure changes from the lumen to the distal cup portion without an exchange of fluid or gas through the barrier; and
  wherein the piston assembly is configured to communicate the suction force through the interior passage of the extension tube and to the lumen extending through the distal cup portion of the suction cup;
  a trigger connected to the housing;
  a locking element received within a loop-shaped guide path, wherein the locking element is affixed to an end of a first trigger spring that follows the locking element around the loop-shaped guide path, the first trigger spring connecting the trigger to the locking element;
  wherein a second trigger spring extends between the trigger and the housing to bias the trigger toward an outwardly extended position;
  and wherein:
    depressing the trigger a first time causes the locking element to move from an unlocked position within the loop-shaped guide path, in which the piston assembly is freely movable, to a locked position within the loop-shaped guide path in which the piston assembly is immovable irrespective of whether the suction cup is in contact with tissue by moving through a first portion of the loop-shaped guide path; and
    depressing the trigger a second time causes the locking element to move from the locked position to the unlocked position by moving through a second portion of the loop-shaped guide path that is different from the first portion; and
  wherein the locked position is a recessed region of the loop-shaped guide path defined proximally to at least part of the first portion and the second portion of the loop-shaped guide path.

* * * * *